Patented Jan. 21, 1941

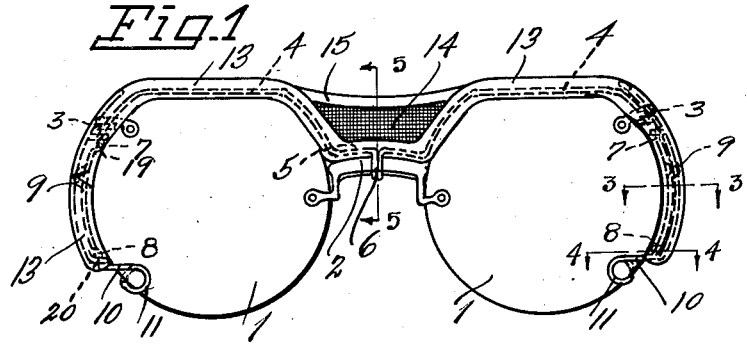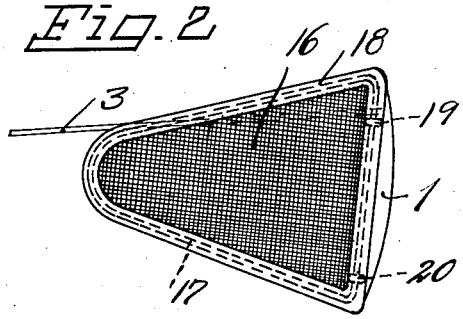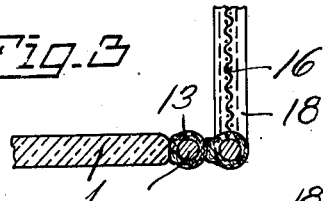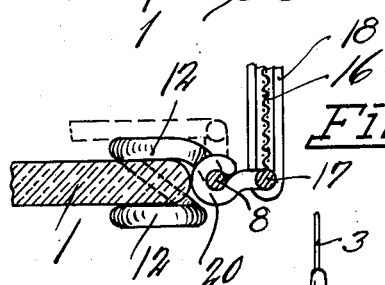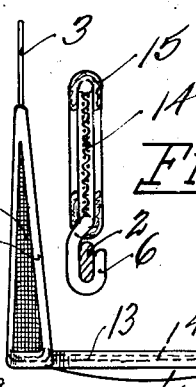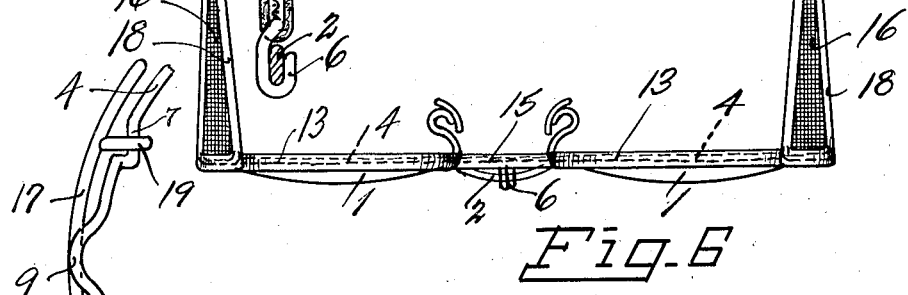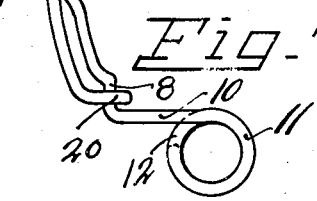

2,229,342

UNITED STATES PATENT OFFICE 2,229,342

WIND AND DUST SHIELD FOR EYEGLASSES

Virgil R. Rux, Reardan, Wash.

Application April 3, 1940, Serial No. 327,618

8 Claims. (Cl. 2—13)

This invention relates to a wind and dust shield and more particularly to a device of this character constituting an attachment for eyeglasses, it being one object of the invention to provide a device which may be easily applied to eyeglasses and serve very effectively to protect a person's eyes from wind and dust and, in addition, prevent dust from blowing between a person's eyes and the eyeglasses and gathering upon the inner or rear surfaces of the lenses of the glasses where it will obstruct a person's vision.

Another object of the invention is to provide a shield having a main frame so formed that it will fit snugly about upper marginal portions of the lenses and across the bridge of the nose piece, said frame having clamps formed integral therewith and adapted to grip marginal portions of the lenses and firmly but detachably hold the shield in place Another object of the invention is to so form portions of the main frame that side frames may be pivotally mounted thereon, said portions of the main frame being also so formed that they provide abutments for engaging pivoted ends of the side frame and not only limit outward movement of the side frames but also urge the side frames toward folded position and cause them to have close fitting engagement with a person's face when glasses equipped with the shield are worn.

Another object of the invention is to so form the portion of the main frame which extends over the nose piece of the glasses that it will be provided with a hook which engages the bridge of the nose piece and very effectively assists in holding the frame in proper engagement with the glasses.

Another object of the invention is to provide the main frame with a sheathing which is formed of felt or other suitable material and not only encloses the wire from which the main frame is formed but also constitutes a carrier for a screen disposed over a person's nose to prevent air and dust from blowing back of the glasses through space between upper portions of the lenses.

Another object of the invention is to provide a shield which is so constructed that it may be easily applied to glasses or removed therefrom.

This invention is illustrated in the accompanying drawing, wherein:

Fig. 1 is a view in front elevation showing the improved shield applied to glasses.

Fig. 2 is a side elevation thereof.

Fig. 3 is a sectional view on an enlarged scale taken on the line 3—3 of Fig. 1.

Fig. 4 is a sectional view on the line 4—4 of Fig. 1.

Fig. 5 is a sectional view on the line 5—5 of Fig. 1.

Fig. 6 is a top plan view showing the shield applied to the glasses.

Fig. 7 is a fragmentary view in front elevation of one end portion of the shield.

The wind and dust shield constituting the subject matter of this invention is intended for use as an attachment for a pair of eyeglasses, the eyeglasses being of conventional construction and having the usual lenses 1 and a nose piece 2 mounted between the lenses. Bows 3 may be provided or omitted, as desired.

The shield is detachably applied to the glasses as an accessory and has a main frame formed from a strand of resilient wire. This strand is bent to form yokes 4 connected by a bridging bar 5 and, upon referring to Figs. 1 and 5, it will be seen that the portion of the strand forming the bar 5 is crimped midway its length to form a depending hook 6 for engaging under the bridge of the nose piece 2 and anchoring the frame to the nose piece.

The yokes are substantially arcuate so that they may extend about the upper portions of the lenses 1 with their ends extending downwardly along outer ends of the lenses, as shown in Fig. 1. The portions of the yokes extending downwardly along outer end portions of the lenses are bent to form vertically disposed pintles 7 and 8 and between these pintles the strand is bent to form laterally projecting resilient abutments 9 which are yieldable when subjected to strain. Ends of the strands are bent inwardly to form arms 10 extending inwardly from the lower pintles 8 and, at ends of the arms, extremities of the strand are coiled to form helical clamps 11 having front and rear jaws 12 between which lower marginal portions of the lenses are gripped, as shown in Fig. 4.

A binding 13 which is formed of felt or other suitable material which is soft and pliable, encases the yokes 4 and the bridging bar 5 to prevent direct contact of the yokes and the bridging bar with the lenses and the bridge of the nose piece 2. Above the bridging bar and between the inner end portions of the yokes the binding carries a screen 14 formed of metal screening bound along its upper edge by a strip of binding 15 formed of the same type of material used for the binding 13. This screen extends across the upper portion of a person's nose between the eyes when a pair of glasses equipped with the improved shield are worn and serves very effectively to prevent air and dust from passing between upper portions of the lenses and getting into a person's eyes or gathering upon the rear or inner surfaces of the lenses and obstructing a person's sight.

In order to prevent air and dirt from blowing inwardly at sides of the glasses, there have been provided side screens 16 formed of wire screening carried by frames 17 which are encased in bindings 18. The side screens are of triangular shape, as shown in Fig. 2, with the bases of the triangles directed forwardly, and upon referring to Figs. 5 and 7, it will be seen that the side frames are curved transversely in a vertical direction. Hinge ears or bearing eyes 19 and 20 project laterally and inwardly from forward ends of the side screens and are engaged about the pintles 7 and 8 and pivotally mount the side screens for swinging movement from folded position against inner or rear surfaces of the lenses to extended position in which they project rearwardly from outer sides or ends of the lenses. When the side screens are swung to extended position, their pivoted ends have abutting engagement with the abutments 9 and spring these abutments forwardly to place them under tension and cause the side screens to be urged inwardly toward folded position. This causes the side screens to have close contacting engagement with side portions of a person's head in closing relation to space between outer side portions of the lenses and margins of the eye sockets and air and dust will be prevented from blowing into a person's eyes through the space between the eye sockets and the outer side edge portions of the lenses. When use of the shield is not desired, the clamps 11 may be easily shifted out of gripping engagement with the lenses and the hook 6 detached from the bridge of the nose piece. The shield may then be placed in a pocket or suitable container until again wanted.

Having thus described the invention, what is claimed is:

1. The combination with eyeglasses having lenses and a nose piece mounted between the lenses and having a bridge and lens engaging members, a shield comprising a frame formed from a resilient strand bent to form yokes for extending about upper portions of the lenses and a bar connecting inner ends of the yokes and crimped to form a depending hook midway its length for engaging the bridge of the nose piece, ends of said strand being coiled to form a helical clamp having marginal portions of the lenses gripped between jaws formed by its convolutions, side frames, hinge eyes at front ends of the side frame engaging about outer portions of said yokes and pivotally mounting the side frames, screening carried by the side frames, a slidable binding for said frame, and screening carried by said binding above the bar and having a pliable binding along its upper edge.

2. In combination with eyeglasses having lenses and a nose piece mounted between the lenses and having a bridge and lens engaging members, a shield comprising a frame formed from a resilient strand bent to form yokes for extending about upper portions of the lenses and a bar connecting inner ends of the yokes and crimped to form a depending hook midway its length for engaging the bridge of the nose piece, said yokes having their outer end portions extending downwardly along the lenses and terminating in lens gripping clamps, said end portions being bent to form upper and lower pintles and an outstanding abutment intermediate the spindles, side frames having hinge members engaging about said pintles to pivotally mount the side frames, said abutments serving to engage front ends of the side frames and limit pivotal movement thereof, screening carried by the side frames, a pliable binding for said frame, and screening carried by said binding above the bar and having a pliable binding along its upper edge.

3. A wind and dust shield for eyeglasses comprising a frame formed from a strand of resilient wire bent to form substantially arcuate yokes for fitting about margins of the lenses of a pair of glasses and a bridging bar extending between inner ends of the yokes, said bar being crimped to form a depending anchoring hook for engaging the bridge of a nose piece, ends of the strand being bent to form inwardly extending arms terminating in helical lens gripping clamps and portions of the yokes above the arms being bent to form upper and lower pintles and outstanding abutments between the pintles, a screen mounted above the bridging bar between said yokes, and side screens curved transversely and having bearing eyes engaged about said pintles to mount the side frames for swinging movement from a folded position back of the yokes to a rearwardly extending position disposing their front ends in engagement with said abutments to tension the abutments and urge the side screens toward folded position.

4. A wind and dust shield for eyeglasses comprising a frame formed from a strand of resilient wire bent to form substantially arcuate yokes for fitting about margins of the lenses of a pair of glasses and a bridging bar extending between inner ends of the yokes, said bar being crimped to form a depending anchoring hook for engaging the bridge of a nose piece, ends of the strand being bent to form lens gripping clamps and portions of the strand above the clamps being bent to form abutments, a screen above said bridging bar, and side screens having bearing eyes engaging the yokes above and below the abutments to mount the side frames for swinging movement from folded position back of the yokes to rearwardly extending position disposing their front ends in engagement with said abutments to tension the abutments and urge the side screens toward folded position.

5. A shield for eyeglasses comprising a frame having lens engaging portions and an intermediate bridging portion, clamps carried by said lens engaging portions for gripping the lenses of a pair of glasses, a hook carried by the bridging portion for engaging the bridge of the nose piece of a pair of glasses, a screen extending upwardly from the bridging portion between adjoining portions of the lens engaging portions, and side screens pivoted to the lens engaging portions for movement from folded position to rearwardly extending position for use.

6. A shield for eyeglasses comprising a frame having lens engaging yokes and a bar connecting inner ends thereof, clamps carried by said yokes and consisting of helical members, the strands of said helical members constituting jaws for gripping the lenses of eyeglasses to detachably hold the yokes in place, a screen extending between the yokes over said bar, and side screens carried by outer end portions of said yokes and movable from folded position to rearwardly extending position for use.

7. A shield for eyeglasses comprising a frame having lens engaging portions and an intermediate bridging portions, clamps carried by said lens engaging portions for gripping the lenses of a pair of glasses, outer end portions of said yokes being formed with pintles and resilient abutments between the pintles and transversely curved side screens, bearings carried by said side screens and engaging said pintles to pivotally mount the screens, said abutments being in position to engage the pivoted ends of the side screens to limit outward swinging movement of the screens and urge the screens inwardly for close contacting engagement with side portions of a person's head.

8. A shield for eyeglasses comprising a frame having lens engaging portions and an intermediate bridging portion, clamps carried by said lens engaging portions for gripping the lenses of a pair of glasses, outer end portions of said yokes being formed with pintles and resilient abutments between the pintles, a screen extending upwardly from said bar between the yokes, and side screens pivoted to said pintles, said abutments limiting outward swinging movement of the side screens from a folded position and serving to urge the screens inwardly for close contacting engagement with side portions of a person's head.

VIRGIL R. RUX.